(12) United States Patent
Kuo

(10) Patent No.: US 7,918,323 B2
(45) Date of Patent: Apr. 5, 2011

(54) MAGNETIC RESISTOR CONTROL ASSEMBLY

(75) Inventor: Hai-Pin Kuo, Tainan (TW)

(73) Assignee: Sports Art Industrial Co., Ltd, Tainan (TW)

( * ) Notice: Subject to any disclaimer, the term of this patent is extended or adjusted under 35 U.S.C. 154(b) by 763 days.

(21) Appl. No.: 11/957,475

(22) Filed: Dec. 16, 2007

(65) Prior Publication Data

US 2009/0152060 A1   Jun. 18, 2009

(51) Int. Cl.
*F16D 51/00* (2006.01)
(52) U.S. Cl. .................. 188/328; 188/325; 188/79.51
(58) Field of Classification Search .............. 188/161, 188/164, 328, 79.51, 1.11 W, 158, 325
See application file for complete search history.

(56) References Cited

U.S. PATENT DOCUMENTS

| | | | | |
|---|---|---|---|---|
| 1,805,190 A | * | 5/1931 | Semmes | 188/328 |
| 5,711,404 A | * | 1/1998 | Lee | 188/164 |
| 6,119,822 A | * | 9/2000 | Baldwin | 188/79.51 |
| 6,408,989 B2 | * | 6/2002 | Kramer | 188/1.11 R |
| 6,585,087 B2 | * | 7/2003 | Lin | 188/164 |

* cited by examiner

*Primary Examiner* — Melanie Torres Williams

(57) ABSTRACT

A magnetic resistor control assembly for a body training machine comprises a main shaft; a rotor, a stator, an adjusting unit, a sliding block set and a controller. An inner disk and an outer disk clamp of the stator clamping the adjusting unit. The sliding block set has guide tracks, an outer lateral wall of each guide track having a track trench. A lower middle portion of the sliding block set has a round hole; the roller being installed and rollable in the guide track; and the retaining rod of the roller is placed within the track trench. A controller is installed at an outer side of the stator; the controller having a transfer pin which displace in the straight grooves. When the transfer pin drives the sliding block set to move in the straight grooves, the gap between permanent magnets and the magnetic isolation ring is changed.

5 Claims, 5 Drawing Sheets

MAGNETIC RESISTOR CONTROL ASSEMBLY

FIELD OF THE INVENTION

The present invention relates to body training machines, and particularly to a magnetic resistor control assembly, wherein magnetic resistance is controlled precisely. A transfer pin is directly used to interact with an adjusting unit so as to control the gap between two magnetic guide iron sheets of a stator and the magnetic isolation ring precisely and thus to resist against the resisting force from variation of the magnetic flux.

BACKGROUND OF THE INVENTION

In one prior art, U.S. Pat. No. 6,719,107, a power generator is used to drive a motor in a gear box. It has a slow reaction to resisting force. For example, about 20 seconds are necessary for adjusting from a Level 1 to Level 9. If we reduce this time, the resolution for precise become worse.

In another prior art, U.S. Pat. No. 6,084,325, a current driving motor serves to adjust the resistance force with a quick response and the resolution of the current to control the resistance force is higher. In U.S. Pat. No. 6,719,107, the gear 33 in the gearbox is directly connected to a rod 34. The rod 34 is further connected to the rod 21. The gearbox has a variator (variable resistor) for detecting the resisting force. The parts of this patent are easy to destroy as it is used for a long time. In repairing work, the whole gearbox must be detached and then the rod 34 is detached for updating the parts. The repair work is inconvenient.

In another prior art U.S. Pat. No. 5,711,404, two ropes 72 are used to pull the brake pieces 51. The ropes 72 are soft. If the gap between the magnet of the brake and the magnetic isolation ring is overlarge to be out of the control of the absorption force of the magnet, the brake piece cannot return to the normal position. Thus a spring 53 is used to assist the returning work of the brake piece 51.

It should be noted that the numerals of the elements cited above are identical to the specification of these patents. Thus the readers can understand these patents directly from the specifications of these patents.

SUMMARY OF THE INVENTION

Accordingly, the primary object of the present invention is to provide a magnetic resistor control assembly, wherein a magnetic resistor control assembly, wherein magnetic resistance is controlled precisely. A transfer pin is directly used to interact with an adjusting unit so as to control the gap between two magnetic guide iron sheets of a stator and the magnetic isolation ring precisely so as to resist the resisting force due to the variation of the magnetic flux.

To achieve above objects, the present invention provides a magnetic resistor control assembly, wherein the present invention comprise the following elements.

A main shaft is directly installed to a base of a body training machine.

A rotor has an inner hole, and a magnetic isolation ring is installed to an wall of the inner hole. One rear end of the rotor has a bottom. An axial hole is formed in the bottom of the rotor. A bearing is fixed to the axial hole.

A stator is formed by an inner disk, and an outer disk. The inner disk and outer disk clamps an adjusting unit. An outer diameter of the stator is slightly smaller than an inner diameter of the magnetic isolation ring. The outer disk has a straight groove. The inner disk has a straight groove. A fixing block is adhered to the outer disk. The axial hole of the fixing block is aligned to an axial hole of the outer disk and the axial hole of the inner disk. A plurality of fixing elements serve to combine the fixing block, the inner disk and the outer disk. The main shaft passes through the axial holes of the fixing block, the inner disk and the outer disk so that the stator is secured to the main shaft.

Two positioning holes are formed on the inner disk near an outer edge. The adjusting unit has magnetic guide iron sheets which are pivoted to the positioning holes of the inner disk by using positioning pins. The pivoting portions of the magnetic guide iron sheets are positioning ends. Each of the magnetic guide iron sheet is installed with a permanent magnet. Another end of each magnetic guide iron sheet has a swingable arm end. A distal end of each arm end is extended inwards with a fixing rod which extends inwards. A distal end of each fixing rod is installed with a roller. The inner disk are installed with two positioning blocks corresponding to the outer ends of the arm end for limiting the swinging of the arm end.

A sliding block set has guide tracks at a left and a right side thereof. An outer lateral wall of each guide track has a track trench. A lower middle portion of the sliding block set has a round hole.

The roller is installed and rollable in the guide track and. The retaining rod of the roller is placed within the track trench. When the sliding block set moves vertically to the center of the round. The roller moves in the guide track. The arm end of the magnetic guide iron sheet will shift from the magnetic isolation ring of the rotor.

After assembly, the rotor is interacted with a treadle (not shown) of the body training machine. The rotor rotates with the movement of the treadle so that the rotor having the magnetic isolation ring also rotates therewith. Therefore, eddy current generates between the magnetic isolation ring and the permanent magnets of the stator. According to Lenz's Law, the magnetic field from the eddy current will resist against the variation of the original magnetic field. Thus, a resistance is applied to the rotor so as to be as a load of the body training machine.

Another feature of the present invention will be described herein. A controller is installed in the straight groove of the stator and a positioning post serves to fix the controller to the outer side of the stator. The controller has a motor, a decelerate gear set, a rack, and other fundamental parts for power transfer. However these parts are known in the prior art and thus the details will not be further described herein. The controller has a transfer pin which displace in the straight grooves and a power wire for power transfer. The transfer pin is directly engaged to the round hole of the sliding block set. When the transfer pin drives the sliding block set to move in the straight grooves so as to change the gap between the permanent magnets and the magnetic isolation ring. A minimum gap is illustrated. When the sliding block set moves to the center of the round, the arm ends of the magnetic guide iron sheets will move inwards, the gap is enlarged so as to adjust the magnetic resistance. Since the transfer pin is rigid and will not deform. The transfer pin drives the sliding block set and thus the gap between the two magnetic guide iron sheets and the magnetic isolation ring is precisely controlled so as to change the magnetic flux density and thus change the magnetic resistance.

The various objects and advantages of the present invention will be more readily understood from the following detailed description when read in conjunction with the appended drawing.

DETAILED DESCRIPTION OF THE INVENTION

Figure 1:
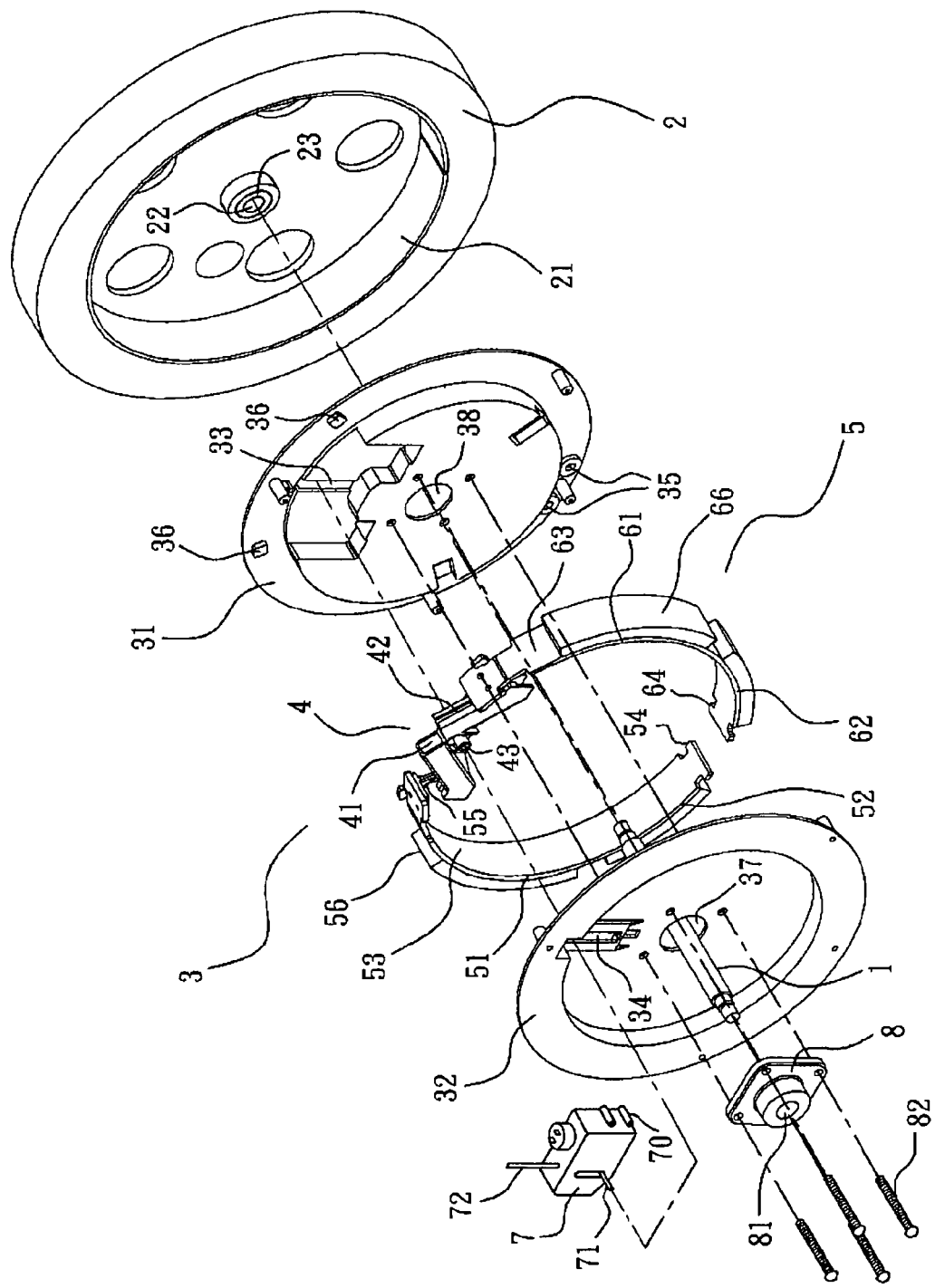
FIG. 1 is an exploded perspective view of the present invention.
Figure 2:
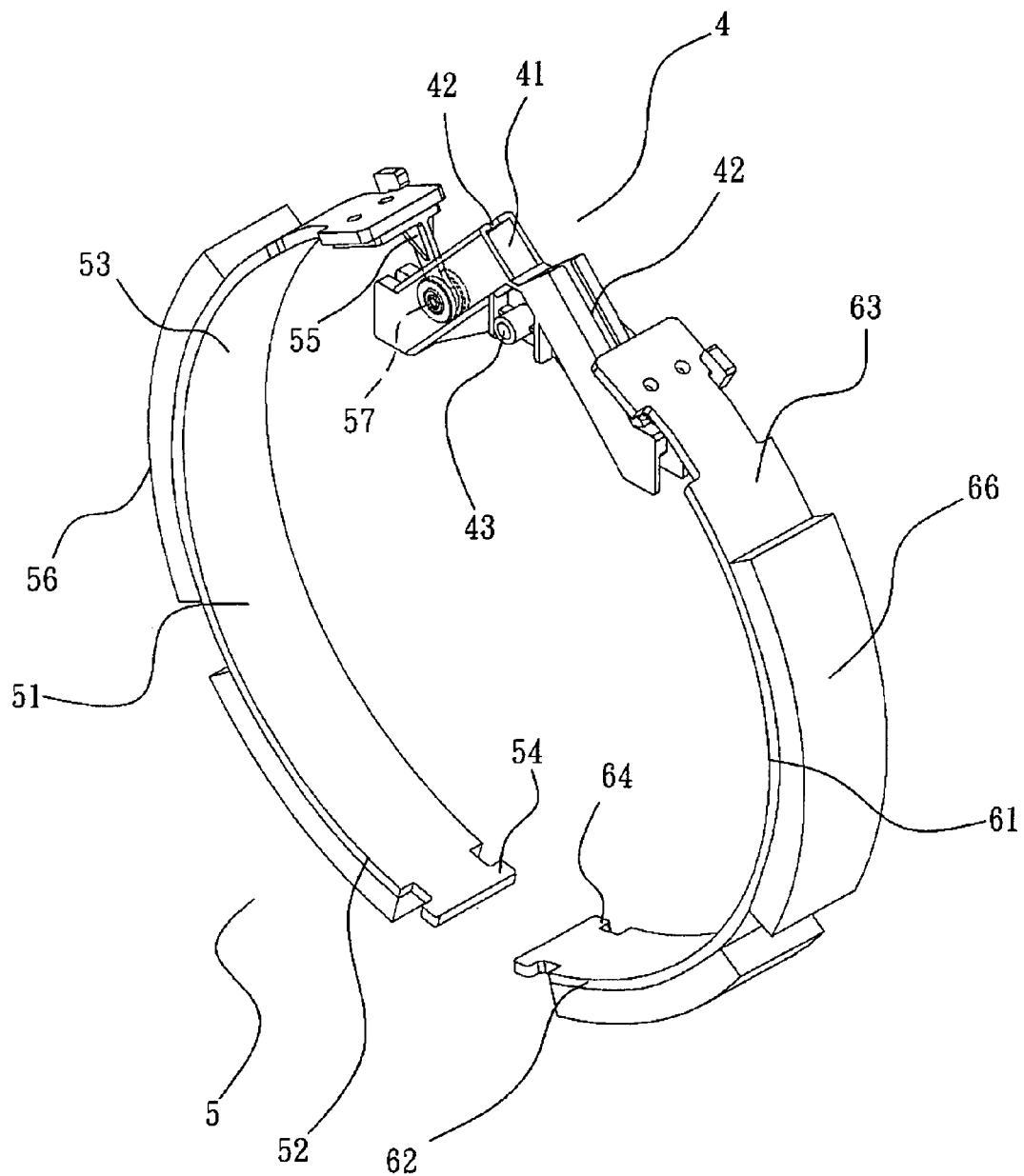
FIG. 2 is an assembled schematic view of the adjusting unit and the sliding block set of the present invention.
Figure 3:
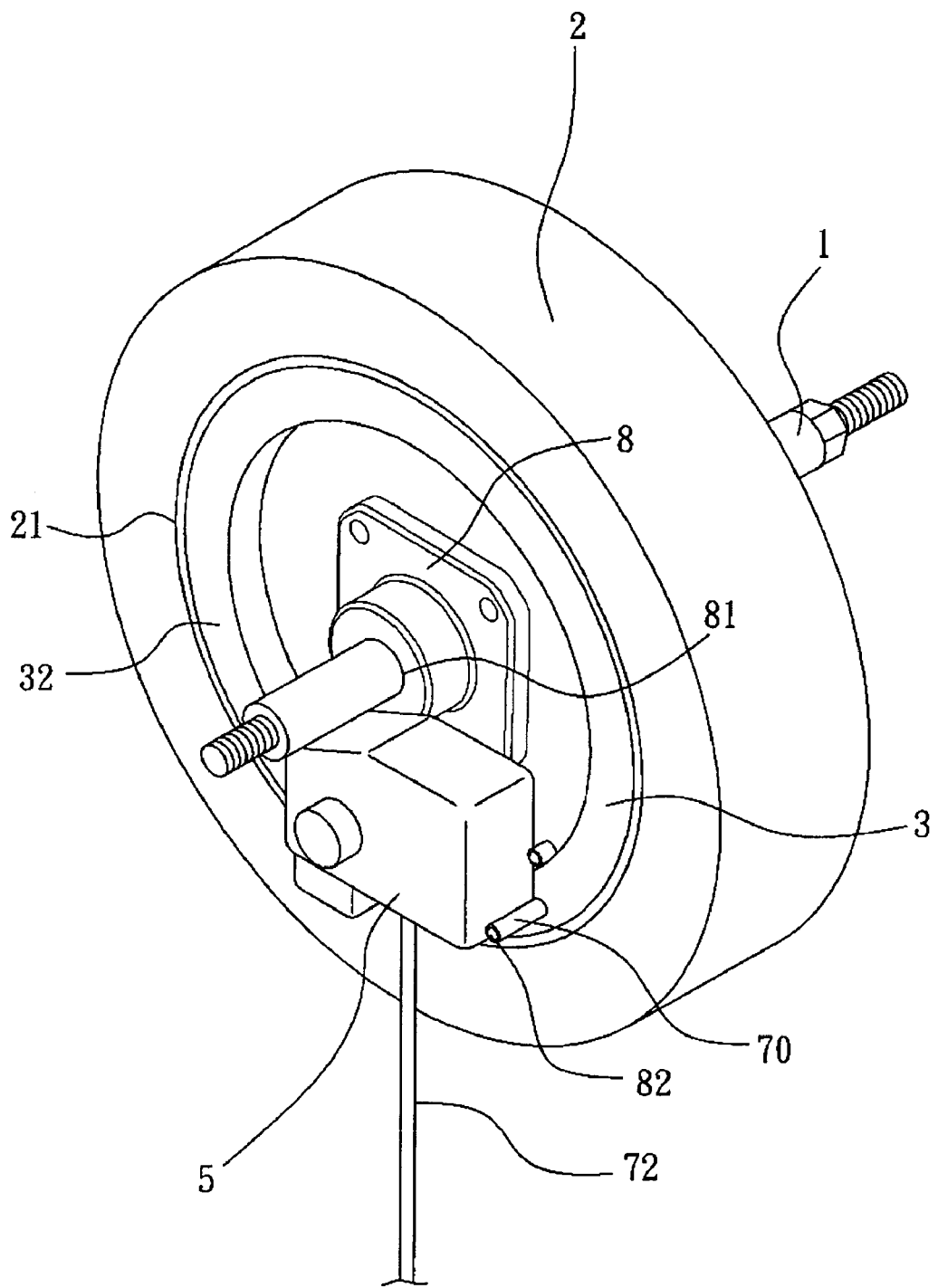
FIG. 3 is an assembled schematic view of the present invention.

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Referring to FIGS. 1 to 5, the magnetic resistor control assembly of a body training machine according to the present invention is illustrated. The present invention has the following elements.

A main shaft is directly installed to a base of a body training machine.

A rotor has an inner hole, and a magnetic isolation ring 21 is installed to an wall of the inner hole. One rear end of the rotor 2 has a bottom. An axial hole 22 is formed in the bottom of the rotor 2. A bearing 23 is fixed to the axial hole 22.

A stator 3 is formed by an inner disk 31, and an outer disk 32. The inner disk 31 and outer disk 32 clamp an adjusting unit 5. An outer diameter of the stator 3 is slightly smaller than an inner diameter of the magnetic isolation ring 21. The outer disk 32 has a straight groove 34. The inner disk 31 has a straight groove 33. A fixing block 8 is adhered to the outer disk 32. The axial hole 81 of the fixing block 8 is aligned to an axial hole 37 of the outer disk 32 and the axial hole 38 of the inner disk 31. A plurality of fixing elements 82 serve to combine the fixing block 8, the inner disk 31 and the outer disk 32. The main shaft 1 passes through the axial holes of the fixing block 8, the inner disk 31 and the outer disk 32 so that the stator 3 is secured to the main shaft 1.

Two positioning holes 35 are formed on the inner disk 31 near an outer edge. The adjusting unit 5 has magnetic guide iron sheets 51, 61 which are pivoted to the positioning holes 35 of the inner disk 31 by using positioning pins 54, 64. The pivoting portions of the magnetic guide iron sheets 51, 61 are positioning ends 52, 62. Each of the magnetic guide iron sheet 51, 61 is installed with a permanent magnet 56, 66. Another end of each magnetic guide iron sheet 51, 61 has a swingable arm end 53, 63. A distal end of each arm end 53, 63 is extended inwards with a fixing rod 55, 65 which extends inwards. A distal end of each fixing rod 55, 65 is installed with a roller 57, 67. The inner disk 31 are installed with two positioning blocks 36 corresponding to the outer ends of the arm end 53, 63 for limiting the swinging of the arm end 53, 63.

A sliding block set 4 has guide tracks 41 at a left and a right side thereof. An outer lateral wall of each guide track 41 has a track trench 42. A lower middle portion of the sliding block set 4 has a round hole 43.

The roller 57, 67 is installed and rollable in the guide track 41. The retaining rod 55, 65 of the roller 57, 67 is placed within the track trench 42. When the sliding block set 4 moves vertically to the center of the round. The roller 57, 67 moves in the guide track 41. The arm end 53, 63 of the magnetic guide iron sheet 51, 61 will shift from the magnetic isolation ring 21 of the rotor 2.

After assembly, the rotor 2 is interacted with a treadle (not shown) of the body training machine. The rotor 2 rotates with the movement of the treadle so that the rotor 2 having the magnetic isolation ring 21 also rotates therewith. Therefore, eddy current generates between the magnetic isolation ring 21 and the permanent magnets, 56, 66 of the stator 3. According to Lenz's Law, the magnetic field from the eddy current will resist against the variation of the original magnetic field. Thus, a resistance is applied to the rotor 2 so as to be as a load of the body training machine.

Figure 4:
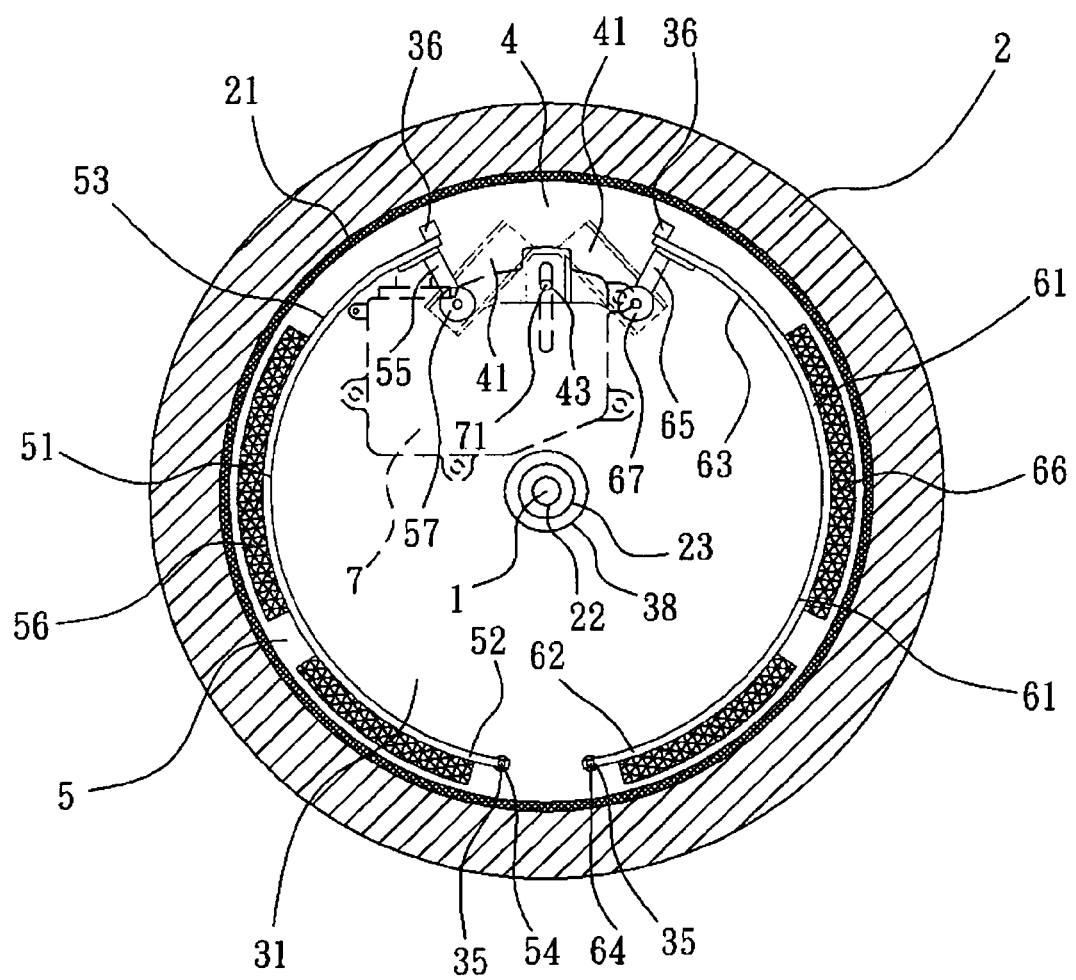
FIG. 4 is an assembled cross sectional view of the present invention.
Figure 5:
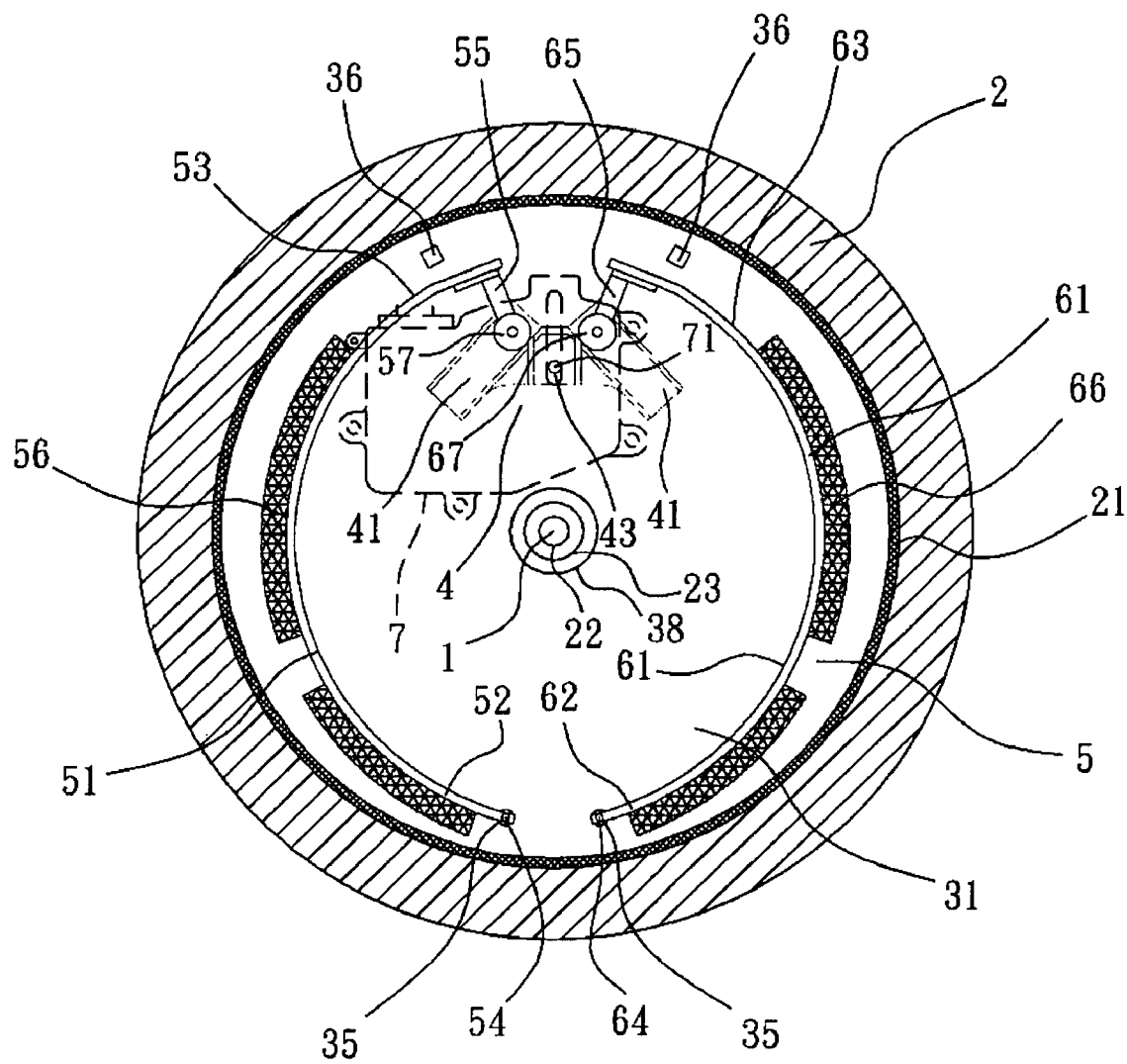
FIG. 5 is a schematic view showing the operation of the rotor and stator according to the present invention.

Another feature of the present invention will be described herein. A controller 7 is installed in the straight groove 34 of the stator 3 and a positioning post 70 serves to fix the controller 7 to the outer side of the stator 3. The controller 7 has a motor, a decelerate gear set, a rack, and other fundamental parts for power transfer. However these parts are known in the prior art and thus the details will not be further described herein. The controller 7 has a transfer pin 71 which displace in the straight grooves, 33, 34 and a power wire 72 for power transfer. The transfer pin 71 is directly engaged to the round hole 43 of the sliding block set 4. When the transfer pin 71 drives the sliding block set 4 to move in the straight grooves 33, 34, the gap between the permanent magnets 56, 66 and the magnetic isolation ring 21 is changed. As shown in FIG. 4, a minimum gap is illustrated. When the sliding block set 4 moves to the center of the round, the arm ends 53, 63 of the magnetic guide iron sheets 51, 61 will move inwards, as shown in FIG. 5, the gap is enlarged so as to adjust the magnetic resistance. Since the transfer pin 71 is rigid and will not deform. The transfer pin 71 drives the sliding block set 4 and thus the gap between the two magnetic guide iron sheets 51, 61 and the magnetic isolation ring 21 is precisely controlled so as to change the magnetic flux density and thus change the magnetic resistance.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A magnetic resistor control assembly for a body training machine, comprising:

a main shaft installed to a base of a body training machine;

a rotor having an inner hole, and a magnetic isolation ring being installed to a wall of the inner hole; one rear end of the rotor having a bottom; an axial hole being formed in the bottom of the rotor; and a bearing being fixed to the axial hole;

a stator formed by an inner disk, and an outer disk; an outer diameter of the stator being slightly smaller than an inner diameter of the magnetic isolation ring;

an adjusting unit; the inner disk and outer disk clamping an adjusting unit; two positioning holes being formed on the inner disk near an outer edge; the adjusting unit having magnetic guide iron sheets which are pivoted to the positioning holes of the inner disk by using positioning pins; the pivoting portions of the magnetic guide iron sheets being positioning ends; each of the magnetic guide iron sheet being installed with a permanent magnet; another end of each magnetic guide iron sheet having a swingable arm end; a distal end of each arm end being extended inwards with a fixing rod which extends inwards; a distal end of each fixing rod being installed with a roller;

a sliding block set having guide tracks at a left and a right side thereof; an outer lateral wall of each guide track having a track trench; a lower middle portion of the sliding block set having a round hole; the roller being installed and rollable in the guide track; and the retaining rod of the roller being placed within the track trench; and a controller installed at an outer side of the stator; the controller having a transfer pin which displace in the straight grooves and a power wire for power transfer; when the transfer pin drives the sliding block set to move in the straight grooves, the gap between the permanent magnets and the magnetic isolation ring is changed.

2. The magnetic resistor control assembly as claimed in claim 1, wherein the inner disk are installed with two positioning blocks corresponding to the outer ends of the arm end for limiting the swinging of the arm end.

3. The magnetic resistor control assembly as claimed in claim 1, wherein the controller has a motor, a decelerate gear set, a rack, and other fundamental parts for power transfer; the controller is fixed to an outer side of the stator for repairing conveniently without detaching the rotor or the stator.

4. The magnetic resistor control assembly as claimed in claim 1, wherein the outer disk has a straight groove; the inner disk has a straight groove; the transfer pin of the controller is movable in the straight grooves.

5. The magnetic resistor control assembly as claimed in claim 1, wherein a fixing block is adhered to the outer disk; the axial hole of the fixing block is aligned to an axial hole of the outer disk and the axial hole of the inner disk; a plurality of fixing elements serve to combine the fixing block, the inner disk and the outer disk; the main shaft passes through the axial holes of the fixing block, the inner disk and the outer disk so that the stator is secured to the main shaft.

* * * * *